United States Patent
Butcher et al.

(10) Patent No.: US 10,353,829 B2
(45) Date of Patent: Jul. 16, 2019

(54) SYSTEM AND METHOD TO ACCOUNT FOR I/O READ LATENCY IN PROCESSOR CACHING ALGORITHMS

(71) Applicant: DELL PRODUCTS, LP, Round Rock, TX (US)

(72) Inventors: Andrew Butcher, Cedar Park, TX (US); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 49 days.

(21) Appl. No.: 15/639,837

(22) Filed: Jun. 30, 2017

(65) Prior Publication Data
US 2019/0004971 A1 Jan. 3, 2019

(51) Int. Cl.
| | |
|---|---|
| *G06F 12/12* | (2016.01) |
| *G06F 12/128* | (2016.01) |
| *G06F 12/0811* | (2016.01) |
| *G06F 12/0808* | (2016.01) |
| *G06F 12/0846* | (2016.01) |
| *G06F 12/0862* | (2016.01) |

(52) U.S. Cl.
CPC ........ *G06F 12/128* (2013.01); *G06F 12/0808* (2013.01); *G06F 12/0811* (2013.01); *G06F 12/0846* (2013.01); *G06F 12/0862* (2013.01); *G06F 12/12* (2013.01); *G06F 2212/283* (2013.01); *G06F 2212/602* (2013.01)

(58) Field of Classification Search
CPC ......... G06F 2212/69; G06F 2212/0864; G06F 2212/1024; G06F 2212/283; G06F 12/123; G06F 12/12; G06F 12/121
See application file for complete search history.

(56) References Cited

U.S. PATENT DOCUMENTS

| | | | | |
|---|---|---|---|---|
| 6,408,362 B1 * | 6/2002 | Arimilli | ............... | G06F 12/127 711/133 |
| 6,671,780 B1 * | 12/2003 | Lu | ......................... | G06F 12/123 711/134 |
| 6,848,026 B2 * | 1/2005 | DeSota | ............... | G06F 12/0864 711/118 |
| 7,143,412 B2 * | 11/2006 | Koenen | ................. | G06F 9/5044 718/102 |
| 7,360,042 B2 * | 4/2008 | Chen | ................. | G06F 17/30902 707/E17.12 |
| 8,140,788 B2 | 3/2012 | Niranjan et al. | | |
| 8,402,223 B2 * | 3/2013 | Birka | .................... | G06F 12/121 711/133 |
| 8,433,856 B2 * | 4/2013 | Cheng | ................... | G06F 12/082 711/146 |
| 8,639,879 B2 * | 1/2014 | Bartley | ............... | G06F 13/1668 711/115 |

(Continued)

*Primary Examiner* — Midys Rojas
*Assistant Examiner* — Khoa D Doan
(74) *Attorney, Agent, or Firm* — Larson Newman, LLP

(57) ABSTRACT

A processor includes a cache memory and a cache controller. The cache controller fetches first data from a first location of an information handling system, stores the first data to a first cache line of a plurality of cache lines, determines first proximity information for the first data based upon the first location, stores the first proximity information in a first proximity tag associated with the first cache line, and evicts the first cache line from the cache based upon the first proximity tag.

16 Claims, 5 Drawing Sheets

(56) References Cited

U.S. PATENT DOCUMENTS

| | | | |
|---|---|---|---|
| 8,819,675 B2* | 8/2014 | Uehara | G06F 9/5077 |
| | | | 718/1 |
| 9,658,967 B2* | 5/2017 | Brandt | G06F 12/0891 |
| 9,727,489 B1* | 8/2017 | Drerup | G06F 12/128 |
| 9,910,788 B2* | 3/2018 | Rogers | G06F 12/121 |
| 9,983,996 B2* | 5/2018 | Bernat | G06F 12/0833 |
| 10,031,869 B1* | 7/2018 | Intrater | G06F 13/1673 |
| 2003/0023827 A1* | 1/2003 | Palanca | G06F 12/0848 |
| | | | 711/173 |
| 2004/0243660 A1* | 12/2004 | Chew | G06F 9/5061 |
| | | | 709/200 |
| 2005/0132140 A1* | 6/2005 | Burger | G06F 12/0846 |
| | | | 711/128 |
| 2006/0041720 A1* | 2/2006 | Hu | G06F 12/0811 |
| | | | 711/136 |
| 2007/0101064 A1 | 5/2007 | Piry et al. | |
| 2007/0118561 A1* | 5/2007 | Idicula | G06F 17/30091 |
| 2007/0156964 A1* | 7/2007 | Sistla | G06F 12/121 |
| | | | 711/133 |
| 2007/0176939 A1* | 8/2007 | Sadowski | G09G 5/393 |
| | | | 345/557 |
| 2007/0288783 A1* | 12/2007 | Ogasawara | G06F 1/3225 |
| | | | 713/323 |
| 2008/0049620 A1* | 2/2008 | Riga | G01D 9/005 |
| | | | 370/236 |
| 2008/0147983 A1* | 6/2008 | Thomas | G06F 12/121 |
| | | | 711/134 |
| 2008/0301378 A1* | 12/2008 | Carrie | G06F 9/3004 |
| | | | 711/147 |
| 2008/0313403 A1 | 12/2008 | Niranjan et al. | |
| 2008/0320234 A1* | 12/2008 | Sugizaki | G06F 12/0804 |
| | | | 711/143 |
| 2009/0193287 A1* | 7/2009 | Jeong | G06F 12/0223 |
| | | | 714/3 |
| 2010/0325361 A1* | 12/2010 | Ohara | G06F 12/126 |
| | | | 711/133 |
| 2014/0156940 A1* | 6/2014 | Weiner | G06F 12/122 |
| | | | 711/133 |
| 2015/0161062 A1* | 6/2015 | Menyhart | G06F 12/0815 |
| | | | 711/147 |
| 2017/0168942 A1* | 6/2017 | Bernat | G06F 12/0833 |
| 2017/0228164 A1* | 8/2017 | Jayasena | G06F 12/0802 |
| 2018/0173637 A1* | 6/2018 | Shifer | G06F 12/0891 |
| 2018/0203799 A1* | 7/2018 | Gaur | G06F 12/0811 |

* cited by examiner

| Location Table |||||||||||||||||
| --- |||||||||||||||||
| | DIMM |||||||| I/O Devices ||||||||
| CC | 312 | 322 | 332 | 342 | 352 | 362 | 372 | 382 | 314 | 324 | 334 | 344 | 354 | 364 | 374 | 384 |
| M1/CC1 | 7 | 5 | 5 | 5 | 3 | 1 | 1 | 1 | 6 | 4 | 4 | 4 | 2 | 0 | 0 | 0 |
| M1/CC2 | 5 | 7 | 5 | 5 | 1 | 3 | 1 | 1 | 4 | 6 | 4 | 4 | 0 | 2 | 0 | 0 |
| M1/CC3 | 5 | 5 | 7 | 5 | 1 | 1 | 3 | 1 | 4 | 4 | 6 | 4 | 0 | 0 | 2 | 0 |
| M1/CC4 | 5 | 5 | 5 | 7 | 1 | 1 | 1 | 3 | 4 | 4 | 4 | 6 | 0 | 0 | 0 | 2 |
| M2/CC1 | 3 | 1 | 1 | 1 | 7 | 5 | 5 | 5 | 2 | 0 | 0 | 0 | 6 | 4 | 4 | 4 |
| M2/CC2 | 1 | 3 | 1 | 1 | 5 | 7 | 5 | 5 | 0 | 2 | 0 | 0 | 4 | 6 | 4 | 4 |
| M2/CC3 | 1 | 1 | 3 | 1 | 5 | 5 | 7 | 5 | 0 | 0 | 2 | 0 | 4 | 4 | 6 | 4 |
| M2/CC4 | 1 | 1 | 1 | 3 | 5 | 5 | 5 | 7 | 0 | 0 | 0 | 2 | 4 | 4 | 4 | 6 |

SYSTEM AND METHOD TO ACCOUNT FOR I/O READ LATENCY IN PROCESSOR CACHING ALGORITHMS

FIELD OF THE DISCLOSURE

This disclosure generally relates to information handling systems, and more particularly relates to accounting for I/O read latency in processor caching algorithms.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A processor may include a cache memory and a cache controller. The cache memory may include a plurality of cache lines, each cache line including a proximity tag. The cache controller may fetch first data from a first location of an information handling system, store the first data to a first cache line of the plurality of cache lines, determine first proximity information for the first data based upon the first location, store the first proximity information in a first proximity tag associated with the first cache line, and evict the first cache line from the cache based upon the first proximity tag.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
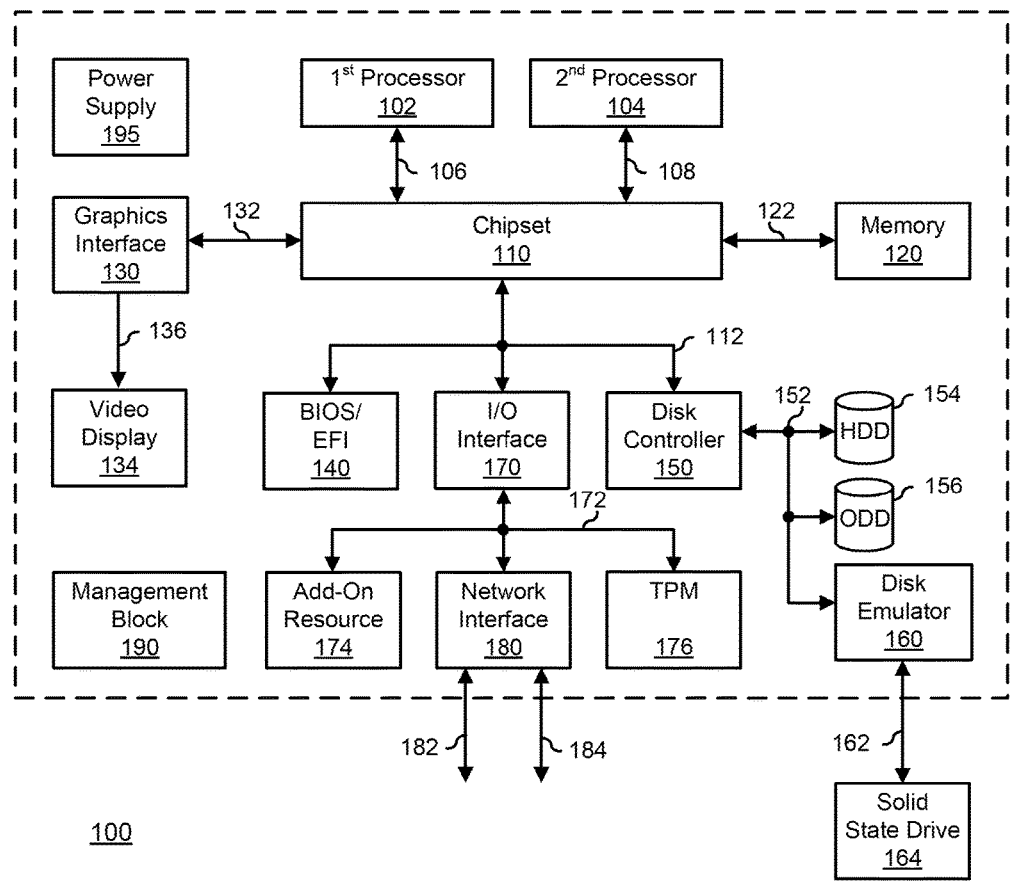
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the information handling system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/ output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
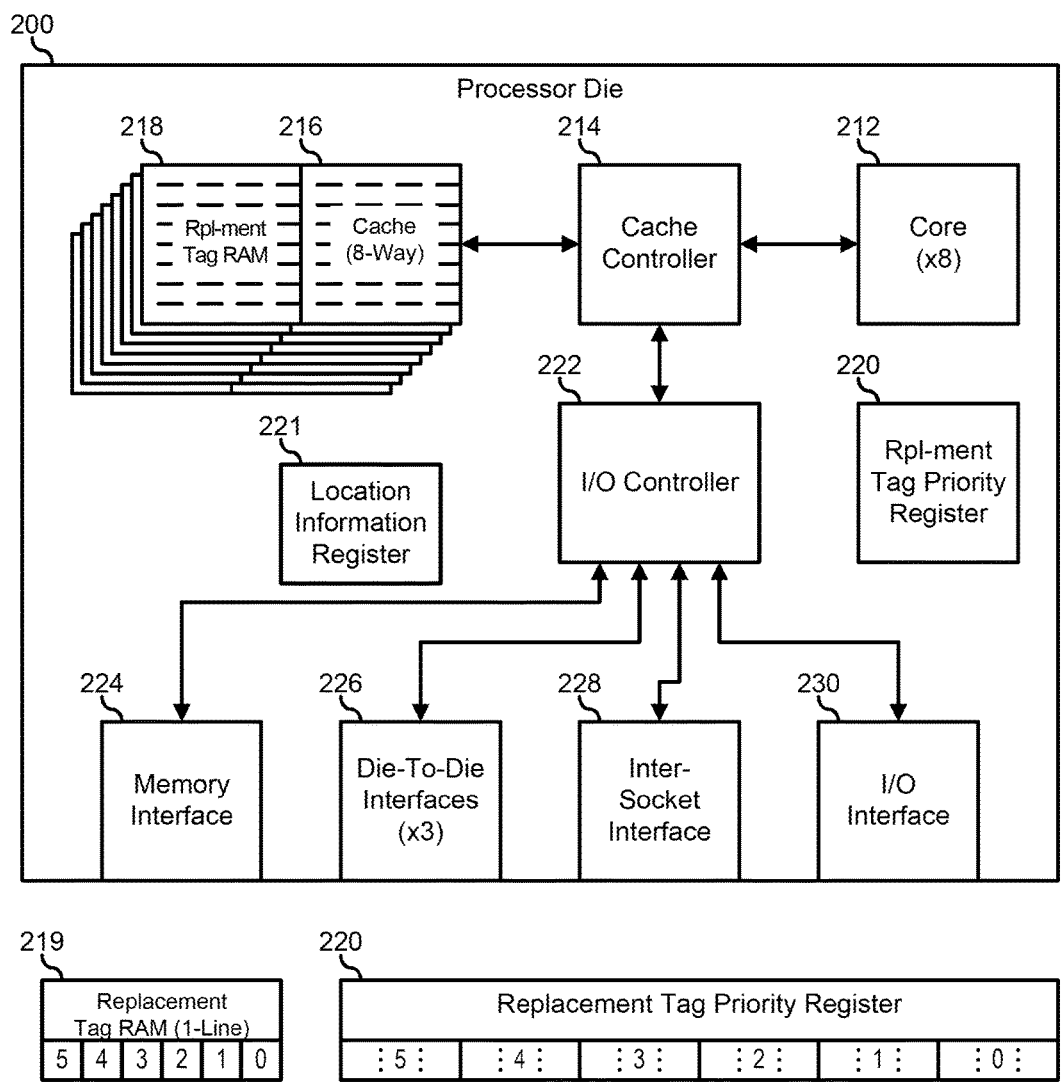
FIG. 2 is a block diagram of a processor according to an embodiment of the present disclosure.
Figure 3:
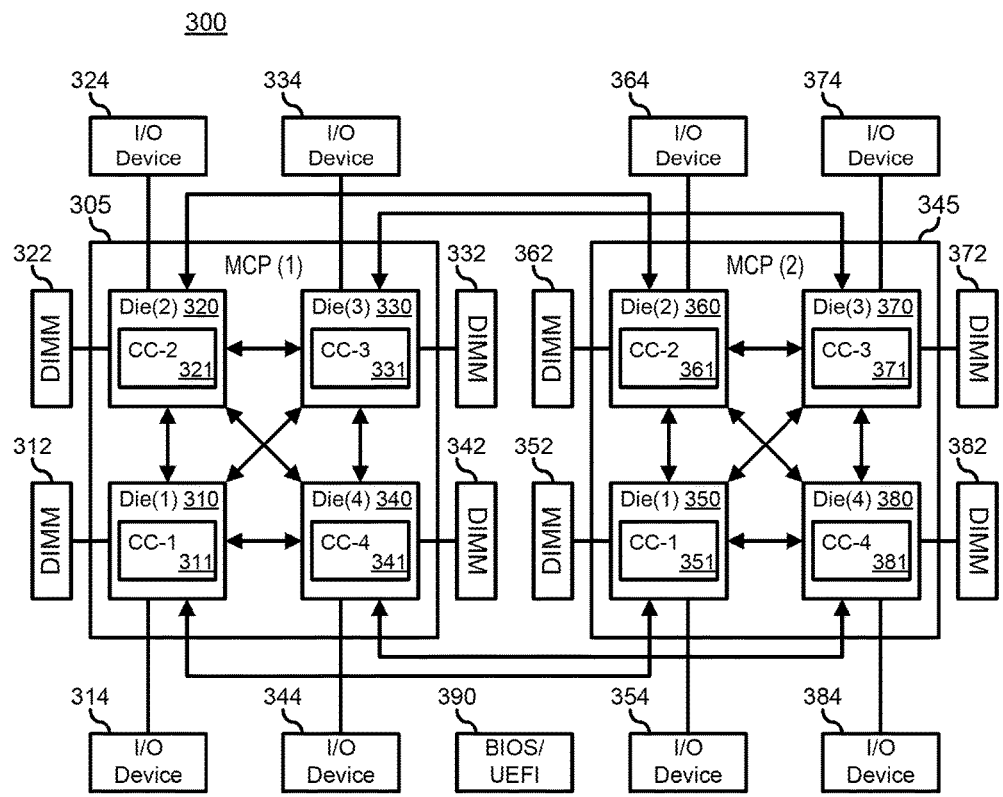
FIG. 3 is a block diagram of an information handling system according to an embodiment of the present disclosure.
Figure 4:
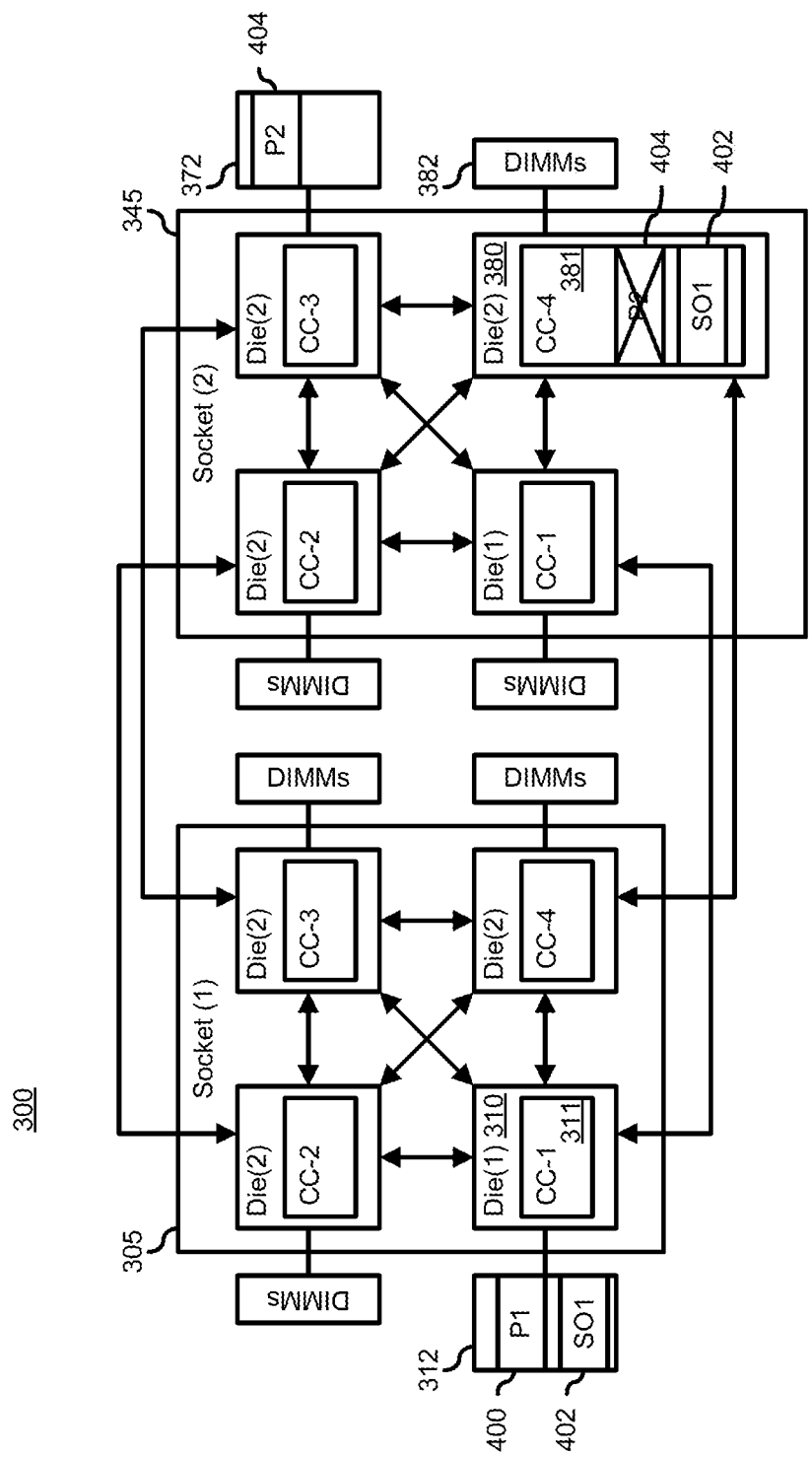
FIG. 4 is a block diagram of the information handling system of FIG. 3 that illustrates a method for accounting for I/O read latency in processor caching algorithms according to an embodiment of the present disclosure.

FIG. 2 illustrates an embodiment of a processor die 200. In a particular embodiment, processor die 200 represents a portion of a multi-chip processor (MCP) that includes two (2) or more processor dies similar to processor die 200. For example, a MCP may include eight (8) processor die similar to processor die 200. In keeping with this embodiment, the MCP represents a portion of an information handling system similar to information handling system 100. The information handling system may include two (2) or more MCPs, where each MCP includes multiple processor dies similar to processor die 200. For example, an information handling system may include two (2) MCPs that each include eight (8) processor dies similar to processor die 200. Such an information handling system is shown in FIGS. 3 and 4, as described further, below. In another embodiment, processor die 200 represents a portion of an information handling system similar to information handling system 100. The information handling system of this embodiment may include one or more processor dies similar to processor die 200.

Processor die 200 includes processor core 212, a cache controller 214, an eight-way set associative cache memory 216 and an associated replacement tag RAM 218, a replacement tag priority register 220, a location information register 221, an I/O controller 222, a memory interface 224, a die-to-die interface 226, an inter-socket interface 228, and an I/O interface 230. Processor core 212 represents one or more processor nodes that are configured to execute machine executable code. In a particular embodiment, processor core 212 represents eight (8) individual processor nodes. Here, it will be understood that each processor node of processor core 212 may include primary code and data cache structures that store recently used code and data and that are dedicated to the use of the associated processor node. However, with respect to the present disclosure, all processor nodes of processor core 212 will be understood to share caching operations via cache controller 214, cache 216, and tag RAM 218 on the level of processor die 200, as described herein. As such, the details of caching with respect to the individual processor nodes of processor core 212 are known in the art and are beyond the scope of the present disclosure, and such details will only be discussed as needed to illuminate the present disclosure.

Cache controller 214 represents logic of processor die 200 that controls the transfer of information between core 212, cache 216, and the various I/O devices that are connected to the processor die. When core 212 accesses a particular memory address in the main memory of the information handling system, cache controller 214 determines whether or not the information associated with the memory address is stored in cache 216. If so, cache controller 214 provides the information to core 212. If the information associated with the memory address is not stored in cache 216, cache controller 214 provides the memory address to I/O controller 222 to fetch the information from the memory address. I/O controller 222 determines whether the memory address is associated with memory devices that are connected to memory interface 224, with memory devices that are connected to other processor die, or with I/O devices that are connected to I/O interface 230. The interface 224, 226, 228, or 230 associated with the memory address then issues transactions to fetch the information from the device associated with the memory address, and provides the information back through I/O controller 222 to cache controller 214. When cache controller 214 receives the information associated with the memory address access from core 212, the cache controller provides the information to the core, and stores the information to cache 216. It will be understood that data caching in processor die 200 may involve determinations as to the cacheability of the information from various memory locations, and that cache controller 214 may participate in such determinations. However, for the purpose of this disclosure, all information handled by processor die 200 will be understood to be from cacheable memory addresses. Note that the particular configuration of processor die 200 is illustrative of a generally implemented processor die architecture, and that other processor die architectures may be implemented without violating the teachings of the present disclosure. For example, in a particular processor die, an I/O controller may be disaggregated from a separate memory controller subsystem. Other details may be implemented as needed or desired in a particular processor die.

Before the information fetched from a memory address of the main memory can be stored in cache 216, cache controller 214 must determine if there is an empty cache line associated with that memory address in any of the eight (8) ways of the cache. If so, the information is stored in the empty cache line. If not, then the cache line associated with that memory address in one of the eight (8) ways must be evicted from the cache in order to make room for the newly fetched information. It will be understood that any cache line eviction will need to be performed by cache controller 214 in accordance with a particular cache coherency protocol, such as a Modified, Exclusive, Shared, Invalid (MESI) protocol or another cache coherency protocol, as needed or desired. However, the details of cache coherency protocols are known in the art and are beyond the scope of the present disclosure, and such details will only be discussed as needed to illuminate the present disclosure.

Cache controller 214 controls the eviction of existing information stored in cache 216 with the newly fetched information based upon a usage eviction policy and a location eviction policy. An example of a usage eviction policy can include a first-in-first-out (FIFO) policy, a last-in-first-out (LIFO) policy, a least recently used (LRU) policy, a time-aware LRU policy, a most recently used (MRU) policy, a least frequently used (LFU) policy, a pseudo-LRU policy, a random replacement policy, a segmented-LRU policy, or another usage eviction policy, as needed or desired. In a FIFO policy, cache controller 214 evicts the cache line from the way that was stored first, regardless of how often or how many times the cache line has been accessed before. In a LRU policy, cache controller 214 evicts the cache line from the way that was accessed least recently. Here, replacement tag RAM 218 includes three (3) age bits that permit the tracking of least recently used cache line. For example, when a particular cache line is accessed, the age bits associated with that cache line in the associated way can be cleared such that the three age bits all store binary zeros (000b). Then, each the age bits of the corresponding cache lines in each of the other seven (7) ways are incremented by one (1), unless the cache line is accessed in successive accesses, in which case the age bits in the other seven (7) ways remain unchanged. Then, when a cache line is to be evicted, the cache line whose age bits all store binary ones (111b), will be selected to evicted. In a LFU policy, cache controller 214 evicts the cache line from the way that was accessed least often. Here, replacement tag RAM 218 includes access bits that count the number of accesses for each cache line in each way. For example, a first cache line may have been accessed three (3) times, a second cache line may have been accessed five (five) times, and a third cache line may have been accessed eight (8) times. Here, when a cache line needs to be evicted, then cache controller 214 will evict the first cache line, even if it is the most recently used cache line.

In implementing the location eviction policy, cache controller 214 operates to determine a proximity of the source of the information in a particular cache line to processor die 200. Here, for example, replacement tag RAM 218 includes three (3) location bits that permit the source location of the information in each cache line. Other numbers of location bits may be utilized as needed or desired. Here further, information from more remote locations from processor die 200 will be retained in cache 216, because fetching such information results in longer delays. On the other hand, information from more proximate locations to processor die 200 will be evicted from cache 216, because fetching such information results in shorter delays. For example, information from a memory device connected to memory interface 224 may be deemed to be most proximate to processor die 200 and so can be quickly fetched, while information from an I/O device connected to another processor die may be deemed to be least proximate to the processor die, and would therefore incur a great penalty. As such, cache controller 214 operates to preferentially retain data from more remote locations and to preferentially evict data from more proximate locations. The details of the location eviction policy will be further describe with respect to FIGS. 3 and 4, below. FIG. 2 further illustrates one line 219 of replacement tag RAM 218, and a detailed illustration of replacement tag priority register 220. Both replacement tag RAM 218 and replacement tag priority register 220, and also location information register 221, will be fully described below.

FIG. 3 illustrates an information handling system 300 similar to information handling system 100. The architecture of information handling system 300 includes a multi-chip processor (MCP) 305, a MCP 345, and a system Basic Input/Output System (BIOS)/Universal Extensible Firmware Interface (UEFI) 390. MCP 305 includes four processor die 310, 320, 330, and 340, similar to processor die 200. Processor dies 310, 320, 330, and 340 are connected together via point-to-point data links established between die-to-die interfaces similar to die-to-die interfaces 226. As such, processor die 310 is connected to processor die 320 via a first point-to-point data link, to processor die 330 via a second point-to-point data link, and to processor die 340 via a third point-to-point data link. Similarly, processor die 320 is connected to processor die 330 via a fourth point-to-point data link and to processor die 330 via a fifth point-to-point data link, and finally, processor die 330 is connected to processor die 340 via a sixth point-to-point data link. An example of the point-to-point data links include a coherent fabric between processor dies 310, 320, 330, and 340, such as a Global Memory Interconnect (GMI) fabric.

Similarly, MCP 345 includes four processor die 350, 360, 370, and 380 similar to processor die 200. Processor dies 350, 360, 370, and 380 are connected together via point-to-point data links similarly to MCP 305 via seventh, eighth, ninth, tenth, eleventh, and twelfth point-to-point data links. The point-to-point data links are established between die-to-die interfaces similar to die-to-die interfaces 226. Further, processor die 310 is connected to processor die 350 via a thirteenth point-to-point data link, processor die 320 is connected to processor die 360 via a fourteenth point-to-point data link, processor die 330 is connected to processor die 370 via a fifteenth point-to-point data link, and processor die 340 is connected to processor die 380 via a sixteenth point-to-point data link. The point-to-point data links between processor dies 310 and 350, between processor dies 320 and 360, between processor dies 330 and 370, and between processor dies 340 and 380 are established between inter-socket interfaces similar to inter-socket interface 228. An example of the point-to-point data links between processor dies 310, 320, 330, 340, 350, 360, 370, and 380 include a Graphics Output Protocol (GOP) fabric. Each of processor die 310, 320, 330, 340, 350, 360, 370, and 380 includes eight processor cores. Each core can process up to two threads. Thus information handling system 300 can process up to 128 threads simultaneously. Processor dies 310, 320, 330, 340, 350, 360, 370, and 380 each include a respective cache controller 311, 321, 331, 341, 351, 361, 371, and 381. Cache controllers 311, 321, 331, 341, 351, 361, 371, and 381 are similar to cache controller 214.

Information handling system 300 provides a Non-Uniform Memory Access (NUMA) architecture, where each of processor dies 310, 320, 530, 340, 350, 360, 370, and 380 support one or more memory channels via memory interfaces similar to memory interface 224. As such, information handling system 300 is shown with processor die 310 connected to a Dual In-Line Memory Module (DIMM) 312, with processor die 320 connected to DIMM 322, with processor die 330 connected to DIMM 332, with processor die 340 connected to DIMM 342, with processor die 350 connected to DIMM 352, with processor die 360 connected to DIMM 362, with processor die 370 connected to DIMM 372, and with processor die 380 connected to DIMM 382. An example of memory channels and associated DIMMs 312, 322, 332, 342, 352, 362, 372, and 382 includes memory devices in accordance with a Double Data Rate (DDR) DIMM standard, such as a DDR-4 standard, a DDR-5 standard, or another DDR standard. DIMMs 312, 322, 332, 342, 352, 362, 372, and 382 do not necessarily represent a full population of DIMM modules. For example, each of DIMMs 312, 322, 332, 342, 352, 362, 372, and 382 may, in fact represent two or four DIMM sockets per memory channel, each of which may or may not actually be populated with a DIMM device in a particular configuration of information handling system 300. For example, information handling system 300 may be configured to provide an optimal level of system performance at a minimum cost, and so my be configured with only one DIMM module per memory channel, leaving 1-3 DIMM sockets unpopulated and available for future expansion.

Each of processor die 310, 320, 330, 340, 350, 360, 370, and 380 further supports one 16 lane (×16) serial data interface via I/O interfaces similar to I/O interface 230. The ×16 serial data interfaces are highly configurable, supporting several different interface configuration protocols and data rates, as needed or desired. For example, the ×16 serial data interfaces may each be configured in accordance with various PCIe standards, and groups of serial data lanes can be logically configured as ×16 PCIe serial data interfaces, as ×8 serial data interfaces, as ×4 serial data interfaces, as ×2 serial data interfaces, or as ×1 serial data interfaces, as needed or desired. Limitations on permissible configurations are known in the art, as may be dictated by BIOS considerations, PCIe specification considerations, or other considerations, and will not be further discussed herein. Some or all of the serial data lanes of the ×16 serial data interfaces may also be configured in accordance with various Serial-ATA (SATA), SATA-Express, or Ethernet port standards, as needed or desired, and as supported by the various architecture standards for information handling system 300. As illustrated, information handling system 300 is shown with processor die 310 connected to an I/O device 314, with processor die 320 connected to an I/O device 324, with processor die 330 connected to an I/O device 334, with processor die 340 connected to an I/O device 344, with processor die 350 connected to an I/O device 354, with processor die 360 connected to an I/O device 364, with processor die 370 connected to an I/O device 374, and with processor die 380 connected to an I/O device 384. Note that other I/O device configurations may be provided without violating the teachings of the present disclosure.

Information handling system 300 operates to provide a measure of the proximity between cache controllers 311, 321, 331, 341, 351, 361, 371, and 381 and each of DIMMs 312, 322, 332, 342, 352, 362, 372, and 382, and between the cache controllers and each of I/O devices 314, 324, 334, 344, 354, 364, 374, and 384. In the illustrated embodiment, BIOS/UEFI 390 is configured with a location table 302 that correlates a proximity of each of cache controllers 311, 321, 331, 341, 351, 361, 371, and 381 to each of DIMMs 312, 322, 332, 342, 352, 362, 372, and 382, and to each of I/O devices 314, 324, 334, 344, 354, 364, 374, and 384, by ascribing an indication of proximity, or proximity number, to each correlation. In the illustrated embodiment, for reasons which will become clear where replacement tag RAM 219 and replacement tag priority register 220 are described more fully, below, DIMMs and I/O devices that are more proximate to a particular cache controller are ascribed a higher number, while DIMMs and I/O devices that are more distant to that cache controller are ascribed a lower number. For example, considering cache controller 311, shown in location table 301 as "M1/CC1," DIMM 312 is connected directly to processor die 310, and hence is ascribed a highest proximity number of 7. Further, I/O device 314 is directly connected to processor die 310, but, upon an assumption that I/O devices are slower than DIMMs, is ascribed a proximity number of 6. Next, DIMMs 322, 332, and 342, being connected to the other processor die 320, 330, and 340 of MCP 305, will necessitate transactions that hop between processor dies, and so are ascribed a lower proximity number of 5. Similarly, I/O devices 324, 334, and 344, being connected to the other processor die 320, 330, and 340 of MCP 305, will necessitate transactions that hop between processor dies, but are again assumed to slower than the associated DIMMs, and so are ascribed a yet lower proximity number of 4. In a particular embodiment, location table 302 is configured based upon a memory map of a main memory space of information handling system 300, and DIMMs 312, 322, 332, 342, 352, 362, 372, and 382, and I/O devices 314, 324, 334, 344, 354, 364, 374, and 384 are each associated with a range of memory in the memory map.

A further assumption is made that transactions between cache controllers on MCP 305 and the DIMMs and I/O devices connected to MCP 345 are slower than transactions the cache controllers on MCP 305 and the DIMMs and I/O devices connected to MCP 305. Thus, transactions between cache controller 311 and DIMM 352 will necessitate a hop to processor die 345, and so is ascribed a lower proximity number of 3, while I/O device 354 will be ascribed a proximity number of 2. Finally, transactions between cache controller 311 and DIMMs 362, 372, and 382, and between the cache controller and I/O devices 364, 374, and 384 will necessitate a further hop between processor die 350 and the associated processor die 360, 370, and 380, the DIMMS are ascribed a proximity number of 1, and the I/O devices are ascribed a proximity number of 0. Note that as illustrated the proximity numbers can be encoded using three bits, where a proximity number of 0 can be encoded as (000b) and a proximity number of 7 can be encoded as (111b). However, different number of bits may be utilized as needed or desired. For example, no difference in latency may be assumed between DIMM transactions and I/O transactions on a particular processor die, and so fewer bits may be needed to encode the proximity numbers. In another example, the illustrated I/O devices may each represent one or more devices that are associated with the I/O interfaces, and different latencies may be ascribed to the various I/O devices, thereby necessitating a greater number of bits to encode the proximity numbers. In this embodiment, location table 302 can be provided based upon a pre-determined understanding of the architecture of information handling system 300, and so the location table can be provided as a fixed entity within BIOS/UEFI 390.

Note that location table 302 endeavors to ascribe a number to the times needed for a particular cache controller to access the various DIMMs and I/O devices, and so this location table is based upon the various assumptions described above. However, the skilled artisan will understand that, in a real world embodiment, such assumptions may not hold true. For example, it may be the case that all DIMMs that are connected to a particular MCP have an approximately equal latency to all cache controllers on that MCP, and so all of the DIMMs on an MCP can be ascribed a same proximity number to all of the cache controllers on that same MCP. In another example, the proximity numbers ascribed to the various I/O devices may change due to the nature of the various I/O devices. For example, where one I/O device represents a firmware ROM on a main board of information handling system 300, and another I/O device represents a storage controller configured to access a storage array of the information handling system, the proximity numbers may be different between the I/O devices to reflect the different latencies. In another example, the memory can be included in a disaggregated information handling system or other appliance, and can be accessed over a communication network through the I/O devices. As such, a more detailed analysis of the architecture of information handling system 300 would be understood by the skilled artisan to yield more accurate information in providing a location table for an information handling system.

In another embodiment, a location table similar to location table 302 is created during a system boot process of information handling system. Here, BIOS/UEFI 390 operates to time transactions between each of cache controllers 311, 321, 331, 341, 351, 361, 371, and 381 and each of DIMMs 312, 322, 332, 342, 352, 362, 372, and 382, and between each of the cache controllers and each of I/O devices 314, 324, 334, 344, 354, 364, 374, and 384. For example, BIOS/UEFI 390 can operate to compare a timestamp for when a transaction is issued to a timestamp for when the transaction response is received. Then, having actual timing information, BIOS/UEFI 390 operates to populate location table 302. In a first case, BIOS/UEFI 390 loads the actual times of each transaction into location table 302. For example, a binary count of the time for each transaction can be loaded into location table 302, or, if a number of bits needed to capture all of the transactions' times is greater than the number of bits available for each correlation, than BIOS/UEFI 390 can truncate a number of the least significant bits of the times to provide approximations of the actual times to populate the location table. Here, location table 302 will provide information as to the relative duration of each transaction, and can more accurately determine a tradeoff between a usage eviction policy and a location eviction policy, as described further, below.

In a second case, BIOS/UEFI 390 loads a ranking similar to the ranking show in the illustrated example of location table 302. However, here, the ranking is based upon actual time measurements for the various transactions, rather than on a strict architectural analysis of information handling system 300. Here, for example, the timing analysis may reveal that a latency between cache controller 311 and I/O device 334 is as long as the latency between the cache controller and DIMM 352 connected to processor die 350, and so, BIOS/UEFI 390 can store a proximity number of 3 in the associated correlation between the cache controller and the I/O device, instead of storing the proximity number of 4, to show that the latency is approximately the same as for transactions with the DIMM. In either case, after BIOS/UEFI 390 populates location table 302, the BIOS/UEFI provides the information from each row of the location table to the associated processor die. The row information for each cache controller is then stored by the respective processor dies to a location information register similar to location information register 221, for use by each cache controller in implementing its location eviction policy.

In another embodiment, each cache controller operates to time transactions between itself and each of DIMMs 312, 322, 332, 342, 352, 362, 372, and 382, and between itself and each of I/O devices 314, 324, 334, 344, 354, 364, 374, and 384. For example, the cache controllers can operate to compare a timestamp for when a transaction is issued to a timestamp for when the transaction response is received. Then each cache controller populates its own location information register. As noted above with the BIOS/UEFI embodiment, each cache controller can populate its location information register with the actual times of each transactions, or with a ranking of the correlations, as needed or desired.

Returning to FIG. 2, replacement tag RAM 218 includes a portion of replacement tag RAM 219 for each cache line in each way of cache 216. Replacement tag RAM 219 includes six bit locations. In the illustrated embodiment, because cache 216 is an eight-way cache, three bits are utilized for encoding a usage of the contents of each cache line. In the following discussion, the usage eviction policy will be assumed to be a LRU policy, but other usage-based eviction policies may be utilized by cache controller 214, as needed or desired. As such, a bit combination (000b) encodes a most recently used cache line, and a bit combination (111b) encodes the least recently used cache line. The other three bits of replacement tag RAM 219 are utilized for encoding a location associated with the contents of each cache line. For example, assuming that processor die 200 is associated with processor die 310 of information handling system 300, then the contents of a cache line that was fetched from an address location associated with DIMM 312 will be ascribed a three-bit combination of (111b), based upon the value of the proximity number (7) in location table 302, and the contents of a cache line that was fetched from an address location associated with any of I/O devices 364, 374, or 384 will be ascribed a three-bit combination of (000b), based upon the value of the proximity number (0) in the location table.

In a particular embodiment, the location eviction policy is given a higher priority in eviction decisions than the usage eviction policy by ascribing the three-bits of the proximity value to bit locations 5-3 of replacement tag RAM 219, and ascribing the three-bits of the LRU value to bit locations 2-0 of the replacement tag RAM. Then, when a cache line is to be evicted, cache controller 214 compares the values stored in replacement tag RAM 218 for each of the eight (8) cache lines, and evicts the cache line with the highest combined value of the six-bits of the replacement tag RAM. For example, if all eight cache lines are from a location with a same proximity number, then the least recently used cache line will be evicted. However, where the cache lines come from locations with different proximity numbers, then the cache line with the highest proximity number, that is, the cache line from the most proximate location, will be evicted. Where there are two or more cache lines that come from locations with the same, highest, proximity number, then the LRU bits will break the tie, and the cache line that is the least recently used of the two or more cache lines will be evicted. Note that, if the location eviction policy is given a lower priority in eviction decisions than the usage eviction policy by ascribing the three-bits of the proximity value to bit locations 2-0 of replacement tag RAM 219, and ascribing the three-bits of the LRU value to bit locations 5-3 of the replacement tag RAM, then processor die 200 will implement a strict usage eviction policy.

An example algorithm for determining which cache line to evict provides that the most significant bits of each of the eight (8) replacement tag RAMs 219 are compared. If one most significant bit stores a 1 and all of the rest store a 0, then the cache line that stores the 1 is evicted. If two or more most significant bits store a 1, then the next significant bits of those cache lines are compared, and the process repeats until a single cache line is identified for eviction. If all of the most significant bits store a 0, then the next most significant bits of all cache lines are compared and the process repeats until a single cache line is identified for eviction. This is why, as described above with respect to location table 302, the more closely proximate devices are ascribed a higher proximity number, and the more remote devices are ascribed a lower proximity number. The skilled artisan will understand that the senses of the proximity numbers and the LRU bits can be inverted, and the above algorithm can likewise be inverted to search for the cache line with the lowest combined value of the six-bit of replacement tag RAM 219. Here, the sense of the proximity numbers and the LRU bits can be selected as needed or desired.

Replacement tag priority register 220 operates to select the order of priority for the proximity numbers and the LRU bits. As such, replacement tag priority register 220 is shown as including six (6) fields of 3-bits each. Each field is configured to assign a specified bit of either the proximity number or the LRU bits to the associated bit of replacement tag RAM 218. For example, proximity numbers and LRU bits can be encoded as shown in Table 1, below.

TABLE 1

Eviction Bit Encoding

| Code | | | | | | | |
|---|---|---|---|---|---|---|---|
| 111 | 110 | 101 | 100 | 011 | 010 | 001 | 000 |
| Bit PROX$_2$ | PROX$_1$ | PROX$_0$ | Invalid | LRU$_2$ | LRU$_1$ | LRU$_0$ | Invalid |

Here, by storing the string "111/110/101/011/010/001" to replacement tag priority register 220, the above scheme where the location eviction policy is given a higher priority in eviction decisions than the usage eviction policy, because the six (6) bits of replacement tag RAM 218 will be ordered as PROX$_2$, PROX$_1$, PROX$_0$, LRU$_2$, LRU$_1$, LRU$_0$. In another embodiment, the proximity numbers and LRU bits can be interleaved to order the six (6) bits of replacement tag RAM 218 as PROX$_2$, LRU$_2$, PROX$_1$, LRU$_1$, PROX$_0$, LRU$_0$, by storing the string 111/011/110/010/101/001 to replacement tag priority register 220. Other eviction policy prioritization schemes can hereby be utilized by cache controller 214, as needed or desired.

FIG. 4 illustrates an example of accounting for I/O read latency in the caching algorithms for information handling system 300. Here, DIMM 312 is illustrated as storing code to run a process P1, and a shared object SO1. Further, DIMM 372 is illustrated as storing code to run a process P2. Processor die 380 is shown as having fetched the code to run process P2 and stored the code in the cache of the processor die. Processor die 380 is further shown as having fetched the shared object SO1 and stored the shared object in the cache of the processor die. In processor die 380, when new information is fetched, an eviction decision is needed between the process P2 code and the shared object SO1. Assuming that processor die 380 has implemented a scheme where the location eviction policy is given a higher priority in eviction decisions than the usage eviction policy, then the process code P2 will be evicted, even if the shared object SO1 is the least recently used information. Note that in an information handling system such as information handling system 300, each processor die 310, 320, 330, 340, 350, 360, 370, and 380 can prioritize between a usage eviction policy and a location eviction policy by programming its own replacement tag priority register as needed or desired, and all processor die do not need to implement the same prioritization scheme.

Figure 5:
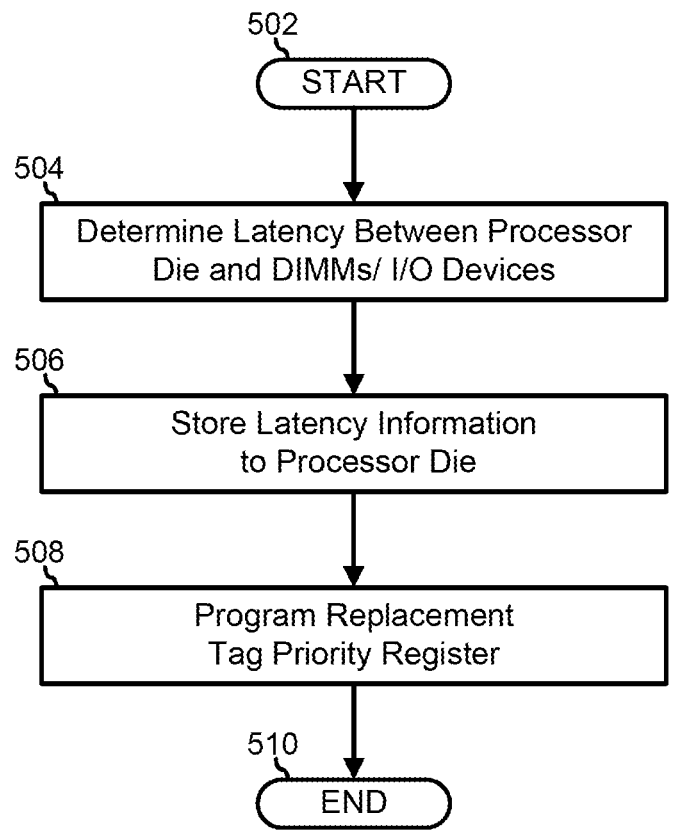
FIG. 5 is a flowchart illustrating a method for accounting for I/O read latency in processor caching algorithms according to an embodiment of the present disclosure.

FIG. 5 illustrates a method of accounting for I/O read latency in processor caching algorithms, starting at block 502. For each processor core in an information handling system, the latencies between the processor die and each DIMM and I/O device is determined in block 504. For example, a BIOS/UEFI can be provided with a location table based upon the architecture of the information handling system, or the BIOS/UEFI or a cache controller of the processor die can determine the latencies between the processor die and each DIMM and I/O device of the information handling system. The latencies can be stored in a location table similar to latency table 302. The latency information is stored to the processor die in block 506. For example, the information from the location table can be provided to the processor die, and the processor die can store the latency information to a latency information register. The information from the location table can be stored in location information register similar to location information register 221. A replacement tag priority register is programmed in the processor die to establish a prioritization between usage eviction policies and a location eviction policy in block 508, and the method ends in block 510.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processor to execute machine-executable code, the processor comprising:
   a cache memory including a plurality of cache lines, each cache line including a proximity tag and a usage tag; and
   a cache controller configured to:
      fetch first data from a first location of an information handling system;
      store the first data to a first one of the cache lines;
      determine first proximity information for the first data based upon the first location;
      store, in a first proximity tag associated with the first cache line, the first proximity information;
      manipulate a first usage tag associated with the first cache line based upon usage of the information by the processor in accordance with a usage eviction policy;
      interleave m-bits of the first proximity tag with n-bits of the first usage tag;
      determine to evict the first cache line by considering the m-bit of the first proximity ma and the n-bits of the first usage tag in an order of the interleaving; and
      evict the first cache line from the cache based upon the first proximity tag and upon the first usage tag.

2. The processor of claim 1, wherein in evicting the first cache line based upon the first proximity tag, the cache controller is further configured to:
   compare the first proximity information with second proximity information stored in a second proximity tag associated with a second cache line, wherein evicting the first cache line is based upon the comparison.

3. The processor of claim 2, wherein in evicting the first cache line based upon the first proximity tag, the cache controller is further configured to:
   determine that second data stored in the second cache line is from a second location that is less proximate to the processor than the first location based upon the comparison, wherein evicting the first cache line is further based upon the determination.

4. The processor of claim 1, further comprising:
a first register to store the first proximity information in association with the first location;
wherein in determining the first proximity information, the cache controller is further configured to:
determine the first location from the first register based upon an address within the main memory associated with the first data; and
select the first proximity information from the first register based upon the first location.

5. The processor of claim 4, wherein the cache controller is further configured to:
receive the locations and the proximity information from the information handling system.

6. The processor of claim 4, wherein the cache controller is further configured to:
initiate a transaction with each of the locations;
determine a latency for each transaction;
determine the proximity information associated with each of the locations; and
store the locations and the proximity information to the first register.

7. The processor of claim 1, wherein in evicting the first cache line from the cache based upon the first proximity tag and the first usage tag, the cache controller is further configured to base the evicting first in order on the first proximity tag, and second in order on the first usage tag.

8. The processor of claim 1, further comprising:
a second register configured to define the interleaving.

9. A method, comprising:
fetching, by a cache controller of a processor, first data from a first location of an information handling system;
storing, by the cache controller, the first data to a first one of a plurality of cache lines of a cache of the processor;
determining, by the cache controller, first proximity information for the first data based upon the first location;
storing, by the cache controller, in a first proximity tag associated with the first cache line, the first proximity information;
storing, by the cache controller in a first usage tag associated with the first cache line, usage information associated with the first data;
manipulating the first usage tag based upon usage of the information by the processor in accordance with a usage eviction policy;
interleaving m-bits of the first proximity tag with n-bits of the first usage tag;
determining to evict the first cache line by considering the m-bit of the first proximity tag and the n-bits of the first usage tag in an order of the interleaving; and
evicting, by the cache controller, the first cache line from the cache based upon the first proximity tag and the usage tag.

10. The method of claim 9, wherein in evicting the first cache line based upon the first proximity tag, the method further comprises:
comparing, by the cache controller, the first proximity information with second proximity information stored in a second proximity tag associated with a second cache line, wherein evicting the first cache line is based upon the comparison.

11. The method of claim 10, wherein in evicting the first cache line based upon the first proximity tag, the method further comprises:
determining, by the cache controller, that second data stored in the second cache line is from a second location that is less proximate to the processor than the first location based upon the comparison, wherein evicting the first cache line is further based upon the determination.

12. The method of claim 9, wherein in determining the first proximity information, the cache controller is further configured to:
determine the first location from a location information register based upon an address within a main memory of the information handling system, the address being associated with the first data, wherein the location information register is configured to correlate a plurality of locations within the main memory with a plurality of proximity information; and
select the first proximity information from the location information register based upon the first location.

13. The method of claim 12, further comprising:
receiving, by the cache controller, the locations and the proximity information from the information handling system.

14. The method of claim 12, further comprising:
initiating, by the cache controller, a transaction with each of the locations;
determining, by the cache controller, a latency for each transaction;
determining, by the cache controller, the proximity information associated with each of the locations; and
storing, by the cache controller, the locations and the proximity information to the location information register.

15. The method of claim 9, wherein in evicting the first cache line from the cache based upon the first proximity tag and the first usage tag, the method further comprises:
basing, by the cache controller, the evicting first cache line in order on the first proximity tag, and second cache line in order on the first usage tag.

16. An information handling system, comprising:
a main memory; and
a processor including:
a cache memory including a plurality of cache lines, each cache line including a proximity tag and a usage tag; and
a cache controller configured to:
fetch first data from a first location of the main memory;
store the first data to a first one of the cache lines;
determine first proximity information for the first data based upon the first location;
store, in a first proximity tag associated with the first cache line, the first proximity information;
manipulate a first usage tag associated with the first cache line based upon usage of the information by the processor in accordance with a usage eviction policy;
interleave m-bits of the first proximity tag with n-bits of he first usage tag;
determine to evict the first cache line by considering the m-bit of the first proximity tag and the n-bits of the first usage tag in an order of the interleaving; and
evict the first cache line from the cache based upon the first proximity tag and the first usage tag.

* * * * *